United States Patent [19]
Gonczy et al.

[11] Patent Number: 5,224,832
[45] Date of Patent: Jul. 6, 1993

[54] METHOD OF FABRICATING A MULTILAYER INSULATION BLANKET

[75] Inventors: John D. Gonczy, Oak Lawn; Ralph C. Niemann, Downers Grove; William N. Boroski, Aurora, all of Ill.

[73] Assignee: Universities Research Association, Inc., Washington, D.C.

[21] Appl. No.: 770,163

[22] Filed: Oct. 2, 1991

Related U.S. Application Data

[62] Division of Ser. No. 239,559, Sep. 1, 1988, Pat. No. 5,143,770.

[51] Int. Cl.⁵ .............................................. D05B 1/00
[52] U.S. Cl. ............................. 112/262.1; 242/110.3; 242/7.21; 112/63; 112/121.12
[58] Field of Search ............... 112/262.1, 121.12, 420, 112/412, 402, 415, 430; 242/110.3, 7.21; 428/77, 78, 137, 189, 190, 212; 156/189, 190, 193, 174

[56] References Cited

U.S. PATENT DOCUMENTS

| | | |
|---|---|---|
| 538,464 | 4/1895 | Palmer et al. ................... 242/110.3 |
| 692,474 | 2/1902 | Pope ............................. 242/110.3 X |
| 1,542,082 | 6/1925 | Nelson . |
| 2,208,774 | 7/1940 | Pierson .......................... 242/63 X |
| 2,703,612 | 3/1955 | Nye et al. . |
| 2,805,828 | 9/1957 | Bachman . |
| 3,386,872 | 6/1968 | Medney . |
| 3,673,030 | 6/1972 | De La Naulte et al. . |
| 3,824,140 | 7/1974 | Hofmann . |
| 4,080,915 | 3/1978 | Bompard et al. ................. 112/412 |
| 4,201,351 | 5/1980 | Tolliver ........................ 242/110.3 X |
| 4,506,611 | 3/1985 | Parker et al. .................... 112/63 X |
| 4,889,063 | 12/1989 | Bompard et al. ................ 112/420 X |
| 4,917,756 | 4/1990 | Cahuzac et al. ............. 112/121.12 X |

Primary Examiner—Clifford D. Crowder
Assistant Examiner—Paul C. Lewis
Attorney, Agent, or Firm—McAndrews, Held & Malloy, Ltd.

[57] ABSTRACT

An improved multilayer insulation blanket for insulating cryogenic structures operating at very low temperatures is disclosed. An apparatus and method for fabricating the improved blanket are also disclosed. In the improved blanket, each successive layer of insulating material is greater in length and width than the preceding layer so as to accommodate thermal contraction of the layers closest to the cryogenic structure. The fabricating apparatus has a rotatable cylindrical mandrel having an outer surface of fixed radius that is substantially arcuate, preferably convex, in cross-section. The method of fabricating the improved blanket comprises (a) winding a continuous sheet of thermally reflective material around the circumference of the mandrel to form multiple layers, (b) binding the layers along two lines substantially parallel to the edges of the circumference of the mandrel, (c) cutting the layers along a line parallel to the axle of the mandrel, and (d) removing the bound layers from the mandrel.

3 Claims, 3 Drawing Sheets

METHOD OF FABRICATING A MULTILAYER INSULATION BLANKET

This invention was made with Government support under Contract No. DE-AC02-76CH03000, awarded by the United States Department of Energy. The Government has certain rights in the invention.

This is a divisional of application Ser. No. 07/239,559 filed Sep. 1, 1988, now U.S. Pat. No. 5,143,770.

FIELD OF THE INVENTION

This invention relates to an improved multiple layer insulation blanket and an apparatus and method for fabricating the improved insulation blanket. More particularly, this invention relates to a multiple layer blanket for insulating cryogenic structures operating at very low temperatures. Such multilayer insulation blankets are subjected to extreme temperature gradients along their thicknesses, causing the layers nearest the cryogenic structure to experience dimensional contraction to a greater extent than the layers furthest from the cryogenic structure. As a result, the apparatus and method for fabricating such improved multilayer insulation blankets must account for the dimensional response of the blanket over the entire temperature range of the insulated cryogenic structure.

BACKGROUND OF THE INVENTION

The design of devices that operate at very low temperatures including, for example, the proposed Superconducting Super Collider (SSC), has brought about the need for new solutions to the problem of providing adequate insulation for the components operating at low or cryogenic temperatures. The SSC is an advanced proton-proton collider for use in high energy physics research. The collider will consist of two accelerator rings, each 30 kilometers in diameter and housed in a common tunnel. The rings will accelerate protons to energies up to 20 trillion electron volts (TeV) prior to collision of the protons in particle detection facilities. In order to achieve these energies, the rings will incorporate superconducting magnets to bend the proton beam (dipole magnets) and to focus the beam (quadrupole magnets). The superconducting magnets will operate at cryogenic temperature, i.e., about 4.5 Kelvin (4.5 K.), and will be encased in cryostats, namely, vessels for maintaining a vacuum and constant low temperature. Approximately ten thousand cryostats will be connected end to end to form the SSC accelerator rings. The cryostats and their components must therefore not only be mechanically reliable and thermally stable, but also manufacturable at low cost.

The cryostats play a crucial role in the overall performance of the SSC and other similar devices operating at very low temperatures. The cryostats must minimize heat leak from the outside environment to the superconducting magnets in order to maintain the required cryogenic operating temperature. In fact, the ultimate operating cost of the SSC will depend principally upon the ability of the cryostats to prevent heat leak to the magnets.

The major components of the SSC cryostats are the cryogenic piping, the cold mass assembly (which includes the superconducting magnets), the insulation system, the vacuum vessel, the interconnections between cryostats, and the system for supporting or suspending the cold mass assembly. The insulation system must exhibit high impedance to heat leak from the outside environment to the cold mass assembly. In addition, the insulation system must exhibit dimensional stability over the expected twenty year operating life of the SSC, particularly in response to the numerous warm-ups and cool-downs that the SSC will undergo during its lifetime. The insulation system must also be inexpensive to manufacture and assemble, as well as easy to install, adjust and repair. Very similar concerns apply as well to insulation systems for other devices operating at low temperatures, regardless of the particular construction or tasks performed by such devices.

In each cryostat of the SSC, the cold mass assembly housing the superconducting magnets is surrounded by several regions of progressively higher temperature. The first region directly surrounding the cold mass assembly is the 4.5 K. region, cooled by cryogenic piping containing liquid helium at 4.35 K. A second region known as the 20 K. region surrounds the 4.5 K. region. The 20 K. region is cooled by cryogenic piping containing gaseous helium at 20 K. The 20 K. region is surrounded by a thermal shield (known as "the 20 K. shield") formed from aluminum sheet metal and around which insulation is wrapped. A third region known as the 80 K. region surrounds the 20 K. shield. The 80 K. region is cooled by cryogenic piping containing liquid nitrogen at 77 K. Surrounding the 80 K. region is another thermal shield (known as "the 80 K. shield") formed from aluminum sheet metal and around which insulation is wrapped. A vacuum vessel at room temperature (300 K.) surrounds the 80 K. shield, and all the internal components of the cryostat are subjected to vacuum during operation of the collider.

As stated previously, the insulation installed around the thermal shields of the SSC cryostats must exhibit high impedance to heat leak as well as dimensional stability. To achieve the impedance to heat leak required in such cryogenic applications, insulation in the form of multilayer blankets of thermally reflective material has been found most effective. With respect to dimensional stability, the insulation must be able to withstand contraction in its length and width dimensions caused by exposure to temperature decreases from room temperature to as low as 4.5 Kelvin (4.5 K.). In addition, the insulation for the SSC will be fitted with openings through which the structures supporting or suspending the cold mass assembly will penetrate. Since the cryostat components, including the insulation, will be maintained in a vacuum, the surfaces of the insulation must also be kept substantially free of contaminants. The presence of such contaminants increases the amount of time and energy necessary to establish the vacuum.

Past techniques used in the preparation of multilayer fabrics could not produce multilayer insulation blankets meeting the requirements for applications like the SSC cryostat design. An 1895 patent to Palmer et al., U.S. Pat. No. 538,464, describes an early apparatus for measuring and cutting fabrics which includes a rotatable mandrel. A 1902 patent to Pope, U.S. Pat. No. 692,474, describes a large reel around which successive layers of paper are wound in layers of equal circumference. More recently, Pierson U.S. Pat. No. 2,208,774, issued in 1940, describes a mandrel apparatus used to produce large quantities of identical lengths of cloth. Each of these prior techniques involves the use of a rotatable mandrel to wind successive layers of material. However, these prior mandrels are all designed to contract in radius to maintain an equal circumference over which the material is wound. Consequently, use of these prior techniques would result in the production of multilayer assemblies having layers of identical length and width. Insulation blankets having layers of identical length and width would be unsuitable for cryogenic applications like the SSC, where the layers closest to the cryogenic structure experience more thermal contraction than those furthest away from the cryogenic structure.

Other past techniques would also be unsuitable for the mass production of multilayer insulation blankets for cryogenic applications like the SSC. Tolliver U.S. Pat. No. 4,201,351, issued in 1980, describes an apparatus including a cone-shaped mandrel for cutting plastic film into trapezoidal shapes of varying dimensions. Such a conically shaped mandrel, however, would cause individual layers of the thin, flexible insulating material to travel or "walk" toward the smaller diameter end of the mandrel while being wound, thereby disturbing the registration of the layers.

Other known techniques for producing multilayer assemblies often involve the stacking of successive layers by hand on a flat surface such as a workbench. Such manual stacking techniques suffer from difficulties in maintaining registration of the layers and uniform layer density. Layer registration refers to maintaining the layers in precise alignment in the length and width dimensions. Layer density is a measure of the number of layers per unit thickness, and is most often expressed as the number of layers of thermally reflective material per centimeter. Manual stacking techniques are also more likely than mandrel-based winding techniques to introduce unwanted contaminants onto layer surfaces. In addition, manual stacking techniques are more labor intensive than mandrel-based winding techniques, thereby increasing the cost to mass produce the finished insulation blankets.

The present invention is directed to overcoming these and other difficulties inherent in prior multilayer insulation blankets and techniques for fabricating such insulation blankets. In the present invention, multilayer insulation blankets are produced from thermally reflective material. Each successive layer of thermally reflective material is slightly greater in length and width than the preceding layer as the layers are traversed in the direction of the cryogenic structure around which the blanket is installed. To accomplish such a dimensional gradient in the layer assembly, a rotatable mandrel having an outer surface of fixed radius and of convex cross-section is used to wind successive layers of thermally reflective material. The layers are bound together along two lines parallel to the edges of the circumference of the mandrel. The layers are then cut along a line parallel to the axle of the mandrel and removed from the mandrel, resulting in a multilayer blanket that is suitable for cryogenic applications like the SSC.

OBJECTS OF THE INVENTION

An object of the invention is to provide an improved multilayer insulation blanket, apparatus and method to overcome the deficiencies of prior art designs.

Another object of the invention is to provide a multilayer insulation blanket exhibiting high impedance to heat leak and that is dimensionally stable over the entire temperature range of the cryogenic structure.

Yet another object of the invention is to provide a multilayer insulation blanket that maintains registration of its layers, particularly during such operations as the cutting of openings in the blanket to accommodate penetrating support structures.

Still another object of the invention is to provide multilayer insulation blankets of uniform layer density.

A further object of the invention is to provide a technique for fabricating multilayer insulation blankets that is cost effective and minimizes the introduction of contaminants onto layer surfaces.

A still further object of the invention is to provide a multilayer insulation blanket that is convenient to fabricate, store and install around a cryogenic structure.

SUMMARY OF THE INVENTION

These and other objects are achieved by an improved multiple layer insulation blanket for insulating a cryogenic structure, and an apparatus and method for fabricating the improved blanket. In the improved blanket, each successive layer of thermally reflective material is greater in length and width than the preceding layer as the layers are traversed in the direction of the cryogenic structure around which the blanket is installed. In the preferred embodiment, successive layers of thermally reflective material are separated by a layer of spacer material. The preferred thermally reflective material is double aluminized polyester film and the preferred spacer material is spunbonded polyester.

The apparatus for fabricating the improved multiple layer insulation blanket comprises a frame and a substantially cylindrical mandrel rotatable in the frame. The mandrel has a radially outwardly presented surface of fixed radius that is substantially arcuate in cross-section. In the preferred embodiment, the mandrel surface is convex in cross-section, and the height of the apex or crown is about 1/200 times the width of the mandrel surface.

In the method of fabricating the improved multilayer insulation blanket, the first step is to form multiple layers of thermally reflective material by winding a continuous sheet of the reflective material around the circumference of a rotatable mandrel. The mandrel surface is fixed in the radial direction and is substantially arcuate in cross-section. The next step is to bind the layers along at least two lines substantially parallel to the edges of the circumference of the mandrel. After binding, the next step is to cut the layers along a line substantially parallel to the axle of the mandrel. The final step is to remove the bound layers from the mandrel. In the finished blanket, the last layer applied to the mandrel is oriented closest to the cryogenic structure. The first layer applied to the mandrel is oriented furthest away from the cryogenic structure.

The improved multilayer insulating blanket, fabricating apparatus and method have applications beyond those specifically described herein for the SSC. Generally speaking, the present invention will be useful in applications that require a supported structure to be insulated in a cryogenic environment subject to wide temperature fluctuations. Examples of such applications include low temperature magnets for industrial and medical uses, dewars for storing liquified gases at low temperatures, and vehicles for transporting low temperature materials.

DETAILED DESCRIPTION OF THE PREFERRED EMBODIMENTS

Figure 1:
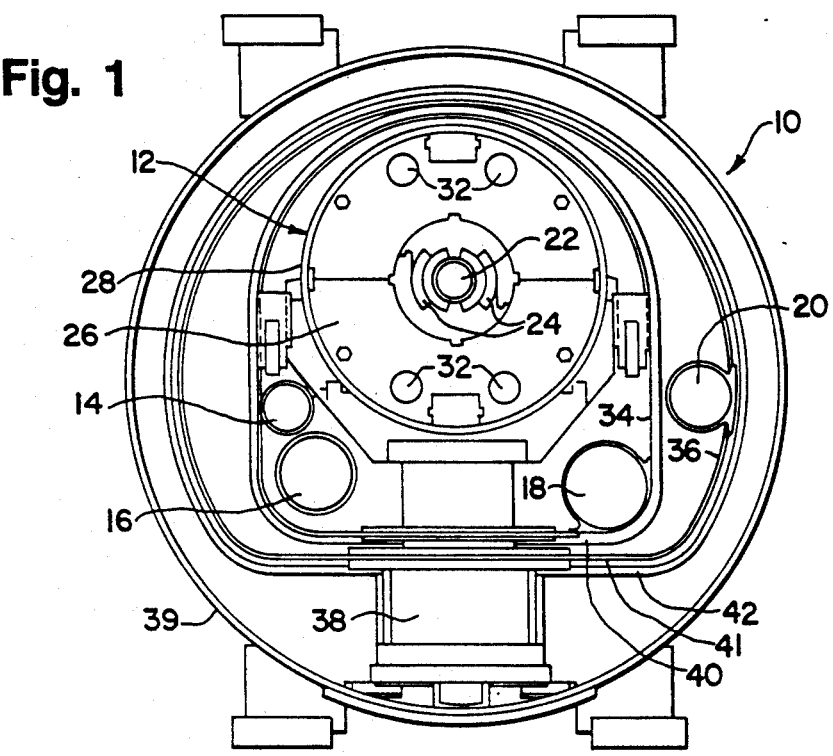
FIG. 1 is a cross-sectional view of an SSC cryostat, particularly illustrating the cryogenic piping, cold mass assembly, thermal shields, insulation system, support post and vacuum vessel.

Turning first to FIG. 1 of the drawings, a typical cryostat 10 to be used in the SSC is shown with its associated cryostat components. The major components of cryostat 10 are the cryogenic piping, cold mass assembly, thermal shields, insulation, support system, vacuum vessel and interconnections between cryostats (not shown).

The cryogenic piping forms the SSC magnet refrigeration system. The piping includes cold mass assembly 12, which contains the 4.35 K. liquid helium coolant channels 32. The cryogenic piping also includes the 4.35 K. liquid helium return pipe 14, the 4.35 K. gaseous helium return pipe 16, the 20 K. thermal shield cooling pipe 18 containing helium coolant, and the 80 K. thermal shield cooling pipe 20 containing liquid nitrogen.

In addition to helium coolant channels 32, cold mass assembly 12 includes proton beam tube 22, superconducting magnet coils 24, iron yoke 26, and outer helium containment shell 28. Iron yoke 26 consists of a series of iron laminations or panels stacked along the length of the cryostat. The cold mass assembly components are joined together to provide a leak-tight and structurally rigid welded assembly. Outer shell 28 is the principle structural element of cold mass assembly 12, and provides the required flexural rigidity between the support posts (one of which is shown as support post 38). The total length of cold mass assembly 12 is approximately 55 feet and its total weight is approximately 16,000 pounds.

As shown in FIG. 1, thermal shields 34 and 36 surround cold mass assembly 12 and are designed to prevent radiative heat leak to the cold mass assembly. Thermal shields 34 and 36 are maintained at temperatures of 20 K. and 80 K., respectively. Shields 34 and 36 are preferably constructed of aluminum sheet metal, and are supported by and thermally anchored to support post 38. One multilayer insulation blanket 40 is installed on the radially outward surface of thermal shield 34. Two multilayer insulation blankets 41 and 42 are installed on the radially outward surface of thermal shield 36, as shown in FIG. 1. Vacuum vessel 39 forms the outer shell of cryostat 10, and allows the internal components of cryostat 10 to be subjected to vacuum during operation of the collider.

Figure 4:
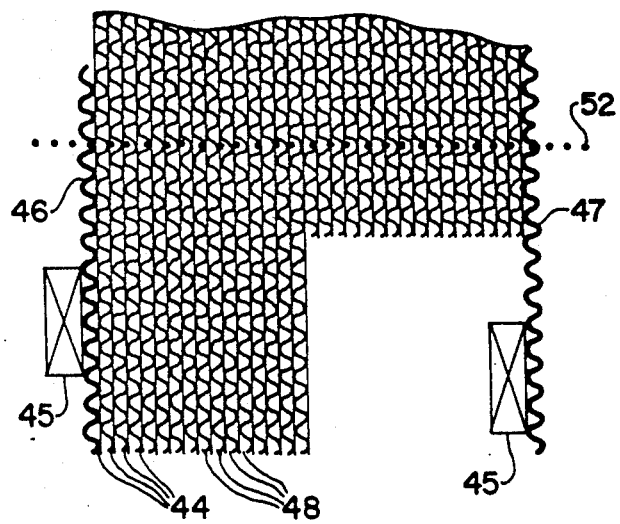
FIG. 4 is an enlarged, detailed sectional view of the end of the improved multilayer insulation blanket circled in FIG. 3.

In the preferred embodiment, the multilayer insulation blankets 40, 41 and 42 consist of multiple layers of thermally reflective material. As shown in FIG. 4, each blanket comprises successive layers of thermally reflective material 44 (illustrated by straight lines) with successive layers of spacer material 48 (illustrated by sinusoidal lines) separating the thermally reflective layers. Thermally reflective material 44 is preferably polyester film having aluminum deposited on both sides. Such thermally reflective polyester film is available commercially as Double Aluminized Mylar (DAM) film. The preferred thickness of the DAM film is approximately 0.001 inches. Other thermally reflective materials could be substituted for DAM in certain applications, such as thermally reflective polyamide film, thermally reflective polyimide film, and thermally reflective polyolefin film. Other thermally reflective metals having low emissivity, such as gold and silver, could also be deposited instead of aluminum on the aforementioned substrates in certain applications. Spacer material 48 is preferably spunbonded polyester, available commercially as Reemay Spunbonded Polyester (RSP) No. 2250. In the preferred embodiment, each blanket consists of 32 layers of DAM separated by 31 layers of RSP. The approximate thickness of the finished insulation blanket is 5/16 inch.

In order to facilitate the binding together of the layers and also to provide a measure of protection to the thermally reflective layers, outer or cover layers 46 and 47 are placed on the surfaces of opposite sides of the blanket. Of course, such cover layers could be omitted in applications which do not require an added degree of rigidity and protection. In the preferred embodiment, protective cover layers 46 and 47 are Reemay Spunbonded Polyester No. 2295, a commercially available material. As described below, the layers are preferably bound together at seam 52 by thread.

FIG. 4 also illustrates strips of fastening material 45 attached to the blanket. In the preferred embodiment, fastening strips 45 are Velcro polyester hook material. Fastening strips 45 mate with corresponding fastening strips on the opposite end of the blanket (not shown in FIG. 4) to facilitate installation of the blanket around the thermal shield. In the preferred embodiment, the fastening strips on the opposite end of the blanket which mate with fastening strips 45 are Velcro polyester loop material. The use of Velcro fastening material is preferred because it eliminates the volatiles and other contaminants associated with adhesive tape and other adhesives generally. The presence of such volatiles and other contaminents increases the time and expense associated with establishing a vacuum in the cryostat.

Figure 2:
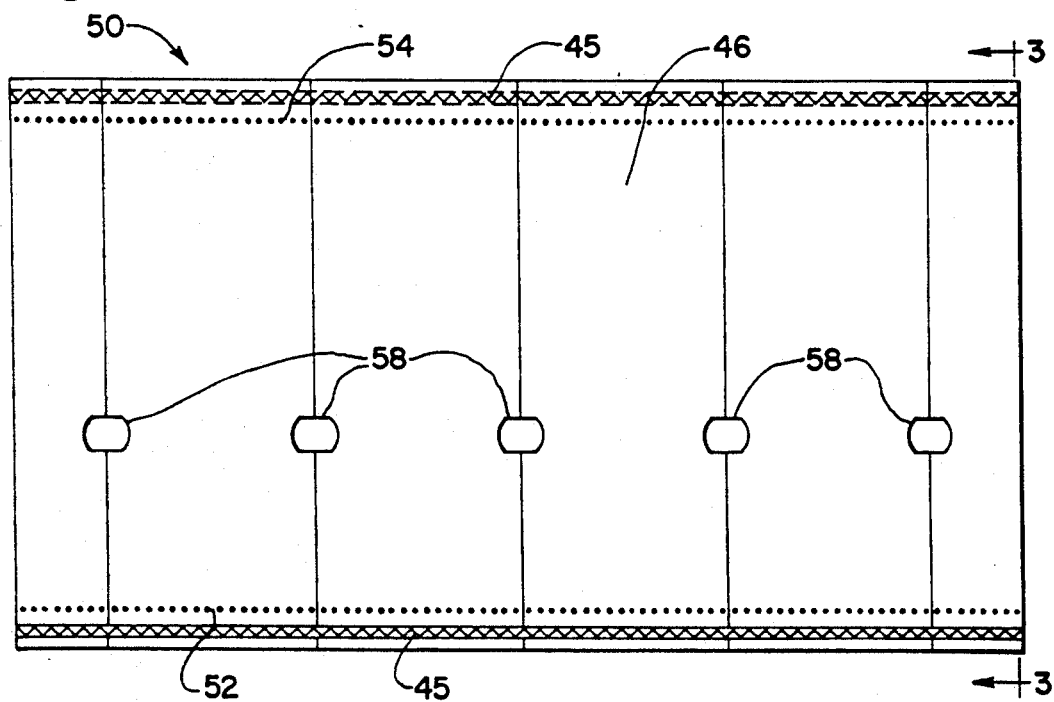
FIG. 2 is a top view of one embodiment of the improved multilayer insulation blanket, particularly illustrating the openings in the blanket for the support posts, the sewn seams binding the layers together, and the fastening strips.

FIG. 2 shows a top view of multilayer insulation blanket 50 having outer protective layer 46. Like the blanket shown in cross-section in FIG. 4, blanket 50 consists of alternating layers of DAM and RSP (not shown). As shown in FIG. 2, the layers of blanket 50 are bound together along the length of blanket 50 by seam 52, preferably using thread available commercially as Belding Polymatic polyester thread. Of course, other suitable fasteners or binding means could be substituted for polyester thread in certain applications. An identical seam 54 runs along the opposite edge of blanket 50, as shown in FIG. 2. Fastening strips 45 are attached to blanket 50, running lengthwise near and parallel to the edges of blanket 50, as shown in FIG. 2. In the preferred embodiment, blanket 50 is approximately 56 feet in length. The insulation blanket installed around the 20 K. thermal shield (illustrated in FIG. 1 as blanket 40) is approximately 65 inches in width, with parallel seams approximately 52 inches apart. The insulation blankets installed around the 80 K. thermal shield (illustrated in FIG. 1 as blankets 41 and 42) are each approximately 72 inches in width, with parallel seams approximately 58 inches apart.

FIG. 2 also illustrates five identical openings 58 in blanket 50. Openings 58 allow the support posts for the cold mass assembly (not shown) to penetrate through blanket 50. In order to minimize heat leak, openings 58 must fit snugly around the support posts throughout all layers of blanket 50. Accordingly, precise registration of the layers must be maintained during the cutting of openings 58 as well as during the insertion of the support posts into openings 58 and operation of the collider.

Figure 3:
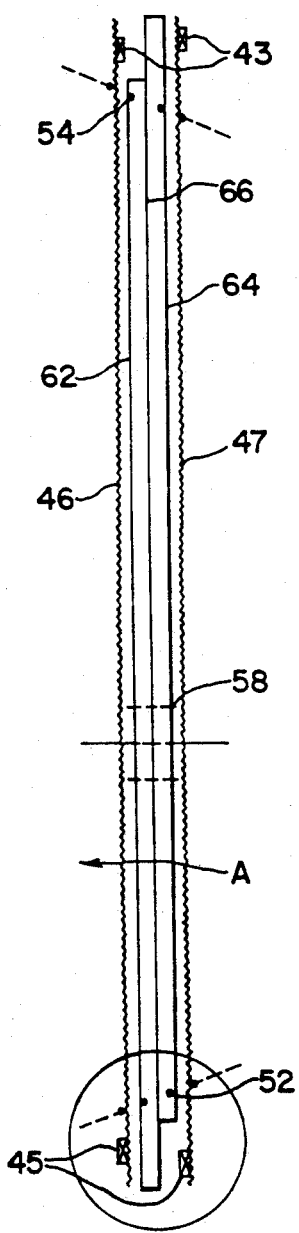
FIG. 3 is a side view of one embodiment of the improved multilayer insulation blanket taken in the direction of line 3—3 of FIG. 2.

FIG. 3 is a side view of the improved multilayer insulation blanket illustrated in FIG. 2. In the blanket shown in FIG. 3, thermally reflective layer 64 is on the "warm" side of the blanket, i.e., on the side intended to be installed furthest from the thermal shield (and cold mass assembly). Conversely, thermally reflective layer 62 is on the cold side of the blanket, i.e., on the side of the blanket intended to be installed closest to the thermal shield (and cold mass assembly). FIG. 3 also shows the relative positions of opening 58, cover layers 46 and 47, and seams 52 and 54. Fastening means 45 register and mate with corresponding fastening means 43 when the blanket is installed around the thermal shield, forming a joined structure that is resistant to heat leak at the interconnection of the blanket ends.

FIG. 3 also schematically illustrates the relative positions of the layers between outermost thermally reflective layers 62 and 64, collectively designated as layers 66. At cryogenic temperatures, the layers closest to the thermal shield (i.e., on the left-hand side of FIG. 3) will undergo thermal contraction to a greater degree than those farther away from the thermal shield (i.e.. on the right-hand side of FIG. 3). Consequently, if the registration of the layers is to be maintained, the dimensioning of the layers must account for such thermal contraction. In the present invention, layers 66 are dimensioned such that each successive layer of thermally reflective material is slightly greater in length and width than the preceding layer as layers 66 are traversed from layer 64 to 62 in the direction of the thermal shield (designated as arrow A in FIG. 3). In other words, layer 62 is the longest and widest thermally reflective layer; layer 64 is the shortest and narrowest thermally reflective layer.

Figure 5:
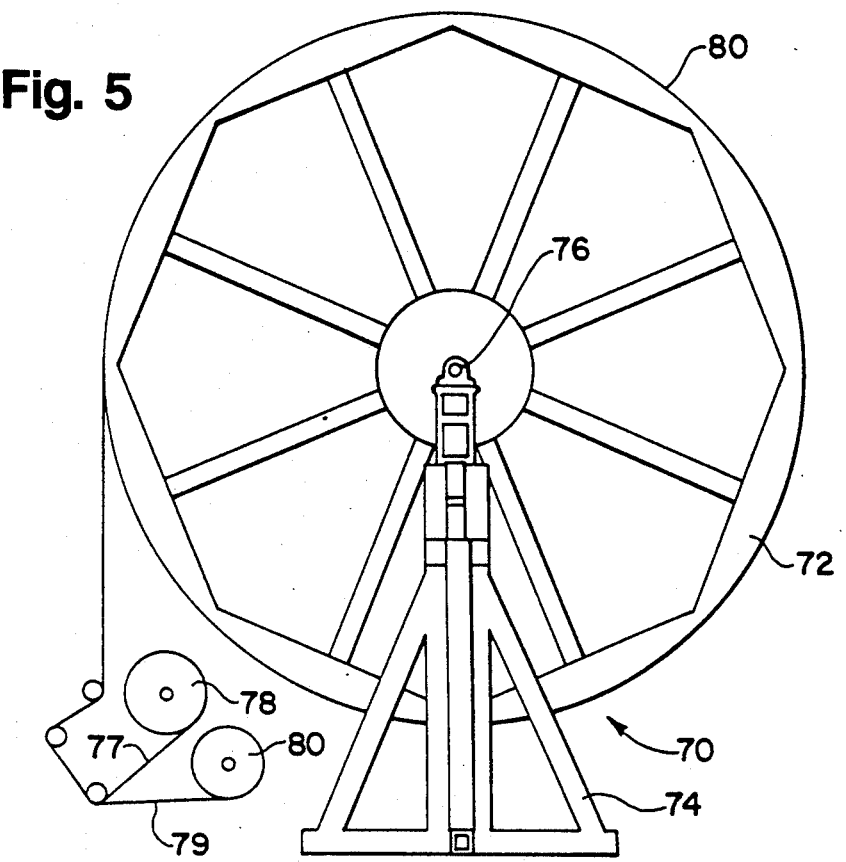
FIG. 5 is a side view of one embodiment of the apparatus for fabricating the improved multilayer insulation blanket, particularly illustrating the frame, rotatable mandrel, and insulation and spacer material being wound onto the mandrel.

Turning now to FIG. 5, an apparatus for fabricating the improved multilayer insulation blanket is generally designated as fabricating apparatus 70. Fabricating apparatus 70 includes mandrel 72 having axle 76 rotatably mounted in a frame, half of which is shown in FIG. 5 as frame 74. Outer surface 80 of mandrel 72 is fixed, that is, the radial distance between axle 76 and surface 80 is kept constant.

As shown in FIG. 5, a continuous sheet of thermally reflective material 77 drawn from web 78 and a continuous sheet of spacer material 79 drawn from web 81 are wound onto mandrel 72. During fabrication, as successive layers of material are wound onto mandrel 72, the circumference of mandrel 72 increases due to the thickness of the material added to surface 80. Since the circumference of mandrel 72 corresponds to the length of the finished blanket, the increase in the circumference of mandrel 72 causes successive layers in the finished blanket to have increasing lengths.

In addition, fabricating apparatus 70 provides for uniform layer density. In this regard, the tension in sheets 77 and 79 can be adjusted to achieve the desired number of layers per unit thickness. The thickness of the spacer material can also be adjusted to achieve the desired layer density. In addition, spacer material can be omitted altogether in certain applications in which crinkled, dimpled or embossed reflective material is used. Successive layers of such material form a corrugated, spaced structure.

Figure 6:
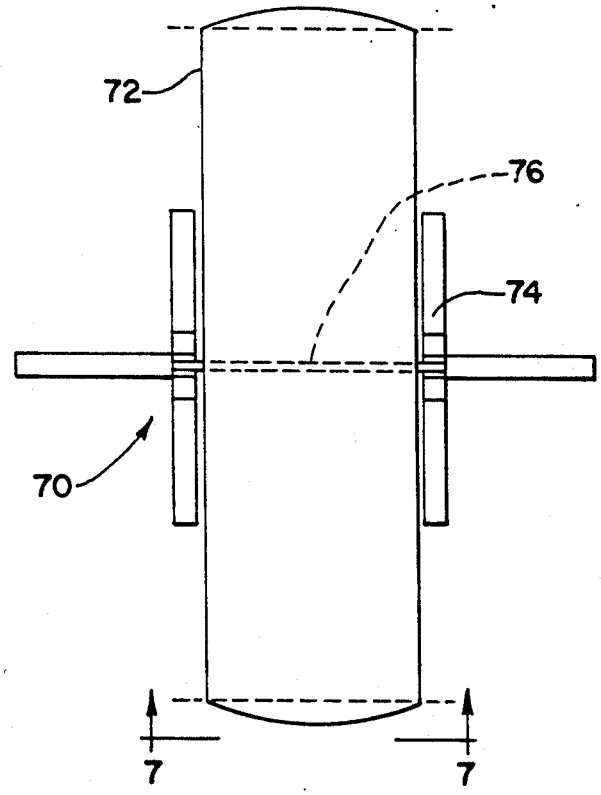
FIG. 6 is a top view of the apparatus for fabricating the improved multilayer insulation blanket, particularly illustrating the axle about which the rotatable mandrel rotates and the frame supporting the axle.

FIG. 6 shows a top view of fabricating apparatus 70, including mandrel 72 having axle 76 rotatably mounted on frame 74.

Figure 7:
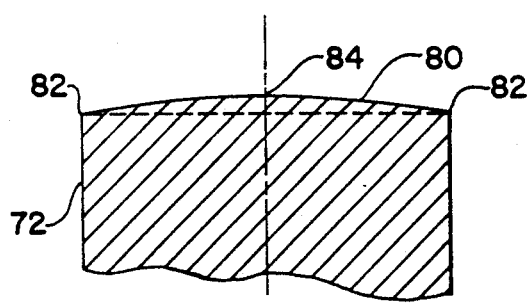
FIG. 7 is a sectional view of the apparatus for fabricating the improved multilayer insulation blanket taken in the direction of line 7—7 of FIG. 6, particularly illustrating the arcuate outer surface of the mandrel.

FIG. 7 is a sectional view of mandrel 72 taken in the direction of line 7—7 of FIG. 6. As shown in FIG. 7, outer surface 80 of mandrel 72 is arcuate, preferably convex, in cross-section. During fabrication, as successive layers of thermally reflective material and spacer material are wound onto mandrel 72, the layers stack up on convex outer surface 80. As the number of layers increases, the arc spanned by each successive layer across surface 80 also increases. In other words, more material extends across convex surface 80, between edges 82, for each successive layer wound onto mandrel 72, and additional material is ultimately captured between the sewn seams (not shown). When the layers are bound together along a line substantially parallel to edges 82 in FIG. 7, and the finished blanket removed from mandrel 72, the arcs formed by the layers determine the amount of added material to account for thermal contraction in the width direction. In the finished blanket, the layers wound closest to surface 80 have less material between the sewn seams than the widths of layers wound furthest from surface 80.

In the preferred embodiment, mandrel 72 has a diameter of approximately 18 feet; the circumference of surface 80 is therefore approximately 56 feet, the length of the finished blanket. The width of surface 80 is approximately 48 inches. As used herein, the width of surface 80 is the linear distance between the circumferential edges of mandrel surface 80, i.e., the linear distance illustrated by the broken line joining edges 82 in FIG. 7. The crown or apex of surface 80 is designated in FIG. 7 as apex 84. The height of apex 84 is approximately $\frac{1}{4}$ inch above the broken line joining edges 82 in FIG. 7. In this embodiment, the height of apex 84 is about 1/200 times the width of surface 80.

Using the aforementioned apparatus, the preferred method of fabricating the improved multilayer insulation blanket first involves wrapping a heavy protective outer or cover layer around the circumference of the mandrel outer surface. After the protective layer is in place around the mandrel, the next step is to wind a continuous strip of thermally reflective material (DAM) onto the circumference of the mandrel outer surface. A continuous sheet of spacer material (RSP) is also wound around the circumference of the mandrel so that each layer of DAM is separated from the next successive layer of DAM by a layer of RSP. The number of such windings of the mandrel corresponds to the number of layers in the finished blanket. Once the desired number of layers is achieved, another heavy protective cover layer is then wrapped around the circumference of the mandrel surface. The layers are then bound together by sewn seams, preferably using polyester thread, along two lines near and substantially parallel to the circumferential edges of the mandrel. The bound layers are then cut along a line substantially parallel to the axle of the mandrel. The finished blanket is then removed from the mandrel and either stored or installed directly on a thermal shield or other cryogenic structure. The layers wound furthest from the mandrel surface are ultimately installed closest to the cryogenic structure.

The binding together of the layers on opposite edges greatly facilitates the handling of blanket assemblies during the fabrication, storage and installation procedures. In particular, it has been found very difficult to handle blanket assemblies of such large size and bulk without the type of fixed registration of the layers described here.

While particular embodiments and applications of the present invention have been shown, it will be understood, of course, that the invention is not limited thereto since modifications may be made by those skilled in the art, particularly in light of the foregoing teachings. It is therefore contemplated by the appended claims to cover any such modification as incorporate those features which come within the true spirit and scope of the invention.

What is claimed is:

1. A method of fabricating a multiple layer insulation blanket from a continuous sheet of thermally reflective material, the method comprising the steps of:
   (a) providing a substantially cylindrical rotatable mandrel, said mandrel having a central axle about which said mandrel rotates and a radially outwardly presented circumferential surface, said surface having parallel circumferential edges and an arcuate cross-section between said edges,
   (b) winding the thermally reflective material about the circumferential surface of said mandrel to form multiple layers of the thermally reflective material, so that successive layers wound on said mandrel have increased circumferential lengths, and wherein the arcuate cross-section of said mandrel causes successive layers to accumulate an increased amount of material between the circumferential edges of said mandrel surface;
   (c) binding the multiple layers together along at least two lines substantially parallel to the circumferential edges of said mandrel surface, so that successive bound layers have increased circumferential lengths, and wherein the arcuate cross-section of said mandrel causes successive bound layers to have an increased amount of material captured between the two lines of binding;
   (d) cutting the multiple bound layers along a line substantially parallel to the axle of the mandrel; and
   (e) removing the multiple bound layers from the mandrel.

2. The method of claim 1, wherein the lines along which the layers are bound are each adjacent to a respective circumferential edge.

3. The method of claims 1, wherein polyester thread is used to bind the multiple layers together.

* * * * *